Feb. 23, 1937.  L. P. BOYER  2,072,021
LEDGER PLATE ANVIL
Filed Oct. 23, 1935

L. P. Boyer
INVENTOR

Patented Feb. 23, 1937

2,072,021

UNITED STATES PATENT OFFICE 2,072,021

LEDGER PLATE ANVIL

Lewis P. Boyer, Butte, Mont.

Application October 23, 1935, Serial No. 46,448

1 Claim. (Cl. 78—6)

The invention relates to a hand anvil and more especially to a ledger plate anvil.

The primary object of the invention is the provision of an anvil of this character, wherein the same can be placed on a guard finger of a mowing machine or cutting apparatus or harvester so as to hold the ledger plate in position for the riveting thereof to the guard finger and thus eliminating the requirement for the removal of the guard finger.

The replacement of ledger plates is a frequent necessity, because of damage received in the working of the mowing machine or the cutting apparatus of the harvester as the ledger plates are rigidly held in position and the cutter bar, in operation, is in continuous motion, the damage resultant to the ledger plates being from sticks or stones caught between the ledger plate and the knife or cutter bar. Therefore, it becomes necessary to replace the ledger plate and have the same rigidly secured to the guard finger by a rivet or rivets. So it is desirable to have an anvil that will fit the guard finger for the convenient riveting of the ledger plate therewith with dispatch and without dismantling the guard fingers. The anvil constituting the present invention meets the requirements for the riveting of the ledger plate upon the guard finger.

Another object of the invention is the provision of an anvil of this character, which is simple in construction, thoroughly reliable and efficient in its operation, readily and easily handled, capable of being applied to and removed from the guard finger with dispatch, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
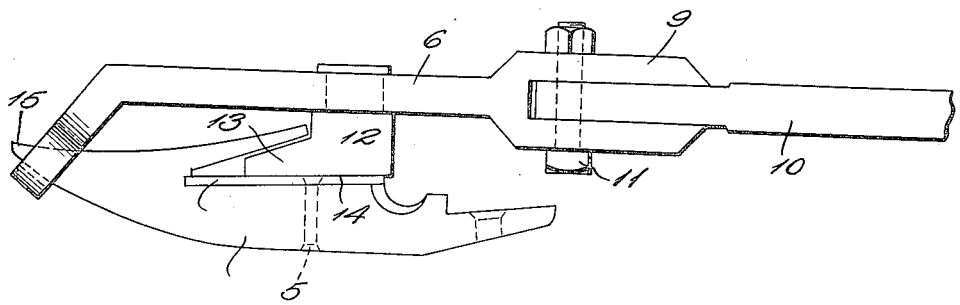
Figure 1 is a side elevation of a guard finger showing the ledger plate riveted thereto and the anvil constructed in accordance with the invention applied.
Figure 2:
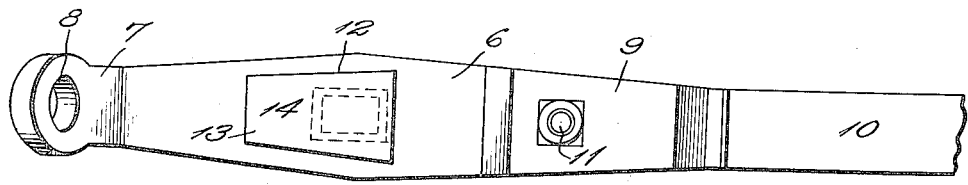
Figure 2 is a plan view of the anvil.

Referring to the drawing in detail, A designates generally a guard finger of conventional kind employed in the cutting apparatus of a harvester or a mowing machine and B the ledger plate, respectively. This ledger plate B is made fast to the guard finger by a rivet 5 and to fasten the rivet in place it necessitates the use of an anvil which constitutes the present invention and will be hereinafter fully described.

The anvil comprises a flat bar 6 reversely tapered from a medial area thereof and at one tapered portion is formed an angularly disposed extension 7 having an eye 8 while the other reversely tapered portion is bifurcated to provide a fork 9 accommodating therein a handle or leverage bar 10, the latter being detachably secured in the fork 9 by a nut carying bolt 11 passed through the fork and said bar.

At the medial portion of the bar 6 and made rigid therewith is a block-like anvil body 12 for the horn 13 which constitutes a continuation of a flat working face 14 to confront the ledger plate B when the pointed end 15 of the guard finger A is engaged in the eye 8 of the extension 7 and in this manner the rivet 5 can be upset for the fastening thereof in the hole accommodating the same in the guard finger A for making fast the ledger plate B. The rivet 5 is upset for the making fast thereof and the securing of the ledger plate B upon the guard finger A by a blow or blows from a hammer 16.

Figure 3:
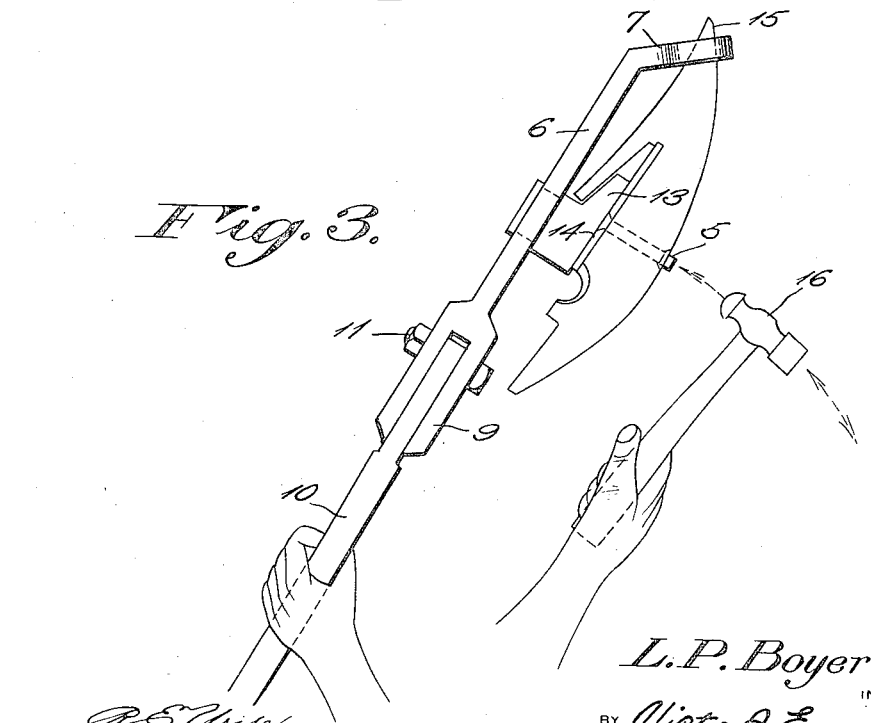
Figure 3 is an exploded perspective view showing the anvil in service for the riveting thereof to the guard finger with the rivet in position to receive a blow from a hammer.

The anvil is readily portable and the horn 13 thereof hooks into the guard finger to hold the working face 14 in confronting relation to the ledger plate B, the anvil being shown in servicing position in Figure 3 of the drawing.

What is claimed is:

A ledger plate anvil comprising a flat elongated bar, an anvil block fixed to said bar intermediate thereof and having a flat work supporting face and also a horn directed forwardly thereof, an angularly bent end on said bar next to the horn, the angular disposition of said end being reversely to the horn, and an eye formed on said angularly disposed extension for the insertion of a tip of a guide finger having a ledger plate when at rest upon said anvil block and a kerf of said guide finger receiving said horn.

LEWIS P. BOYER.